(12) United States Patent
Zhou et al.

(10) Patent No.: US 11,778,609 B2
(45) Date of Patent: *Oct. 3, 2023

(54) TECHNIQUES FOR BEAM SWEEP BASED SEMI-PERSISTENT SCHEDULING / CONFIGURED GRANT ACTIVATION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Jing Sun, San Diego, CA (US); Mostafa Khoshnevisan, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,499

(22) Filed: Jun. 6, 2022

(65) Prior Publication Data

US 2022/0304021 A1 Sep. 22, 2022

Related U.S. Application Data

(63) Continuation of application No. 16/876,761, filed on May 18, 2020, now Pat. No. 11,357,028.

(Continued)

(51) Int. Cl.
*H04W 72/12* (2023.01)
*H04W 72/1268* (2023.01)
(Continued)

(52) U.S. Cl.
CPC ..... *H04W 72/1268* (2013.01); *H04W 72/046* (2013.01); *H04W 72/23* (2023.01)

(58) Field of Classification Search
CPC .......... H04W 72/1268; H04W 72/046; H04W 72/23; H04L 5/0007; H04L 5/001;
(Continued)

(56) References Cited

U.S. PATENT DOCUMENTS

| 11,357,028 B2 | 6/2022 | Zhou et al. |
| 2018/0034515 A1 | 2/2018 | Guo et al. |

(Continued)

FOREIGN PATENT DOCUMENTS

| WO | 2018075146 A1 | 4/2018 |
| WO | 2018147665 A1 | 8/2018 |

OTHER PUBLICATIONS

International Search Report and Written Opinion—PCT/US2020/033543—ISA/EPO—dated Aug. 26, 2020.

(Continued)

*Primary Examiner* — Lan-Huong Truong
(74) *Attorney, Agent, or Firm* — Arent Fox, LLP

(57) ABSTRACT

Aspects described herein relate to beam sweep based semi-persistent signaling (SPS) or configured grant (CG) activation. In one aspect, a network entity may determine a beam sweep pattern for at least one of a SPS based downlink periodic transmission, an uplink control transmission for the SPS based downlink periodic transmission, or a CG based uplink periodic transmission. The network entity may further transmit an indication including the beam sweep pattern to a user equipment (UE). In another aspect, a UE may receive a beam sweep pattern for at least one of a SPS based downlink periodic transmission, an uplink control transmission for the SPS based downlink periodic transmission, or a CG based uplink periodic transmission from a network entity.

24 Claims, 10 Drawing Sheets

Related U.S. Application Data

(60) Provisional application No. 62/861,813, filed on Jun. 14, 2019.

(51) Int. Cl.
 *H04W 72/044* (2023.01)
 *H04W 72/23* (2023.01)

(58) Field of Classification Search
 CPC ... H04L 5/0023; H04L 5/0053; H04L 5/0055; H04L 5/1469; H04B 7/0617; H04B 7/0408
 See application file for complete search history.

(56) References Cited

U.S. PATENT DOCUMENTS

| | | |
|---|---|---|
| 2019/0037426 A1 | 1/2019 | Yu et al. |
| 2019/0281587 A1 | 9/2019 | Zhang et al. |
| 2020/0186312 A1 | 6/2020 | Mochizuki et al. |

OTHER PUBLICATIONS

Nokia., et al., "Enhancements on Multi-TRP/Panel Transmission", R1-1907316, 3GPP TSG RAN WG1 #97 Meeting, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051728755, 24 Pages.

Samsung: "Discussion on UL Beam Management", R1-1713596, 3GPP TSG RAN WG1 Meeting #90, 3rd Generation Partnership Project, Mobile Competence Centre, 650, Route Des Lucioles, F-06921 Sophia-Antipolis Cedex, France, vol. RAN WG1, No. Prague, Czech, Aug. 21, 2017-Aug. 25, 2017, Aug. 20, 2017, XP051316396, 5 Pages.

Samsung: "On Beam Management, Measurement and Reporting", 3GPP TSG RAN WG1 NR AH#3, R1-1715940, 3rd Generation Partnership Project, Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017, 16 Pages, XP051339399.

TECHNIQUES FOR BEAM SWEEP BASED SEMI-PERSISTENT SCHEDULING / CONFIGURED GRANT ACTIVATION

CROSS-REFERENCE TO RELATED APPLICATION(S)

This application is a continuation of U.S. Non-Provisional application Ser. No. 16/876,761, entitled "TECHNIQUES FOR BEAM SWEEP BASED SEMI-PERSISTENT SCHEDULING/CONFIGURED GRANT ACTIVATION" and filed on May 18, 2020, and claims the benefit of U.S. Provisional Application Ser. No. 62/861,813, entitled "TECHNIQUES FOR BEAM SWEEP BASED SEMI-PERSISTENT SCHEDULING/CONFIGURED GRANT ACTIVATION" and filed on Jun. 14, 2019, each of which is expressly incorporated by reference herein in its entirety.

BACKGROUND

Aspects of the present disclosure relate generally to wireless communication systems, and more particularly, to beam sweep based semi-persistent scheduling and/or configured grant activation.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, increases in bandwidth may result in implementation complexities with regard to transmission of data during certain modes. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a network entity is provided. The method includes determining a beam sweep pattern for at least one of a semi-persistent scheduling (SPS) based downlink periodic transmission, an uplink control transmission for the SPS based downlink periodic or a configured grant (CG) based uplink periodic transmission. The method may further include transmitting an indication including the beam sweep pattern to a user equipment (UE).

In a further aspect, the present disclosure includes an apparatus for wireless communication including a memory and at least one processor coupled to the memory. The at least one processor may be configured to determine a beam sweep pattern for at least one of a SPS based downlink periodic transmission, an uplink control transmission for the SPS based downlink periodic or a CG based uplink periodic transmission, and transmit an indication including the beam sweep pattern to a UE.

In an additional aspect, the present disclosure includes an apparatus for wireless communication including means for determine a beam sweep pattern for at least one of a SPS based downlink periodic transmission, an uplink control transmission for the SPS based downlink periodic or a CG based uplink periodic transmission, and means for transmit an indication including the beam sweep pattern to a UE.

In yet another aspect, the present disclosure includes a computer-readable medium storing computer executable code, the code when executed by a processor cause the processor to determine a beam sweep pattern for at least one of a SPS based downlink periodic transmission, an uplink control transmission for the SPS based downlink periodic or a CG based uplink periodic transmission, and transmit an indication including the beam sweep pattern to a UE.

In an aspect of the disclosure, a method of wireless communication at a network entity is provided. The method includes receiving a beam sweep pattern for at least one of a SPS based downlink periodic transmission, an uplink control transmission for the SPS based downlink periodic transmission, or a CG based uplink periodic transmission from a network entity. The method may further include configuring communication using two or more beams on at least one of an uplink channel or downlink channel based on the beam sweep pattern.

further aspect, the present disclosure includes an apparatus for wireless communication including a memory and at least one processor coupled to the memory. The at least one processor may be configured to receive a beam sweep pattern for at least one of a SPS based downlink periodic transmission, an uplink control transmission for the SPS based downlink periodic transmission, or a CG based uplink periodic transmission from a network entity, and configure communication using two or more beams on at least one of an uplink channel or downlink channel based on the beam sweep pattern.

additional aspect, the present disclosure includes an apparatus for wireless communication including means for receiving a beam sweep pattern for at least one of a SPS based downlink periodic transmission, an uplink control transmission for the SPS based downlink periodic transmission, or a CG based uplink periodic transmission from a network entity, and configuring communication using two or more beams on at least one of an uplink channel or downlink channel based on the beam sweep pattern.

In yet another aspect, the present disclosure includes a computer-readable medium storing computer executable code, the code when executed by a processor cause the processor to receive a beam sweep pattern for at least one of a SPS based downlink periodic transmission, an uplink control transmission for the SPS based downlink periodic transmission, or a CG based uplink periodic transmission from a network entity, and configure communication using two or more beams on at least one of an uplink channel or downlink channel based on the beam sweep pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
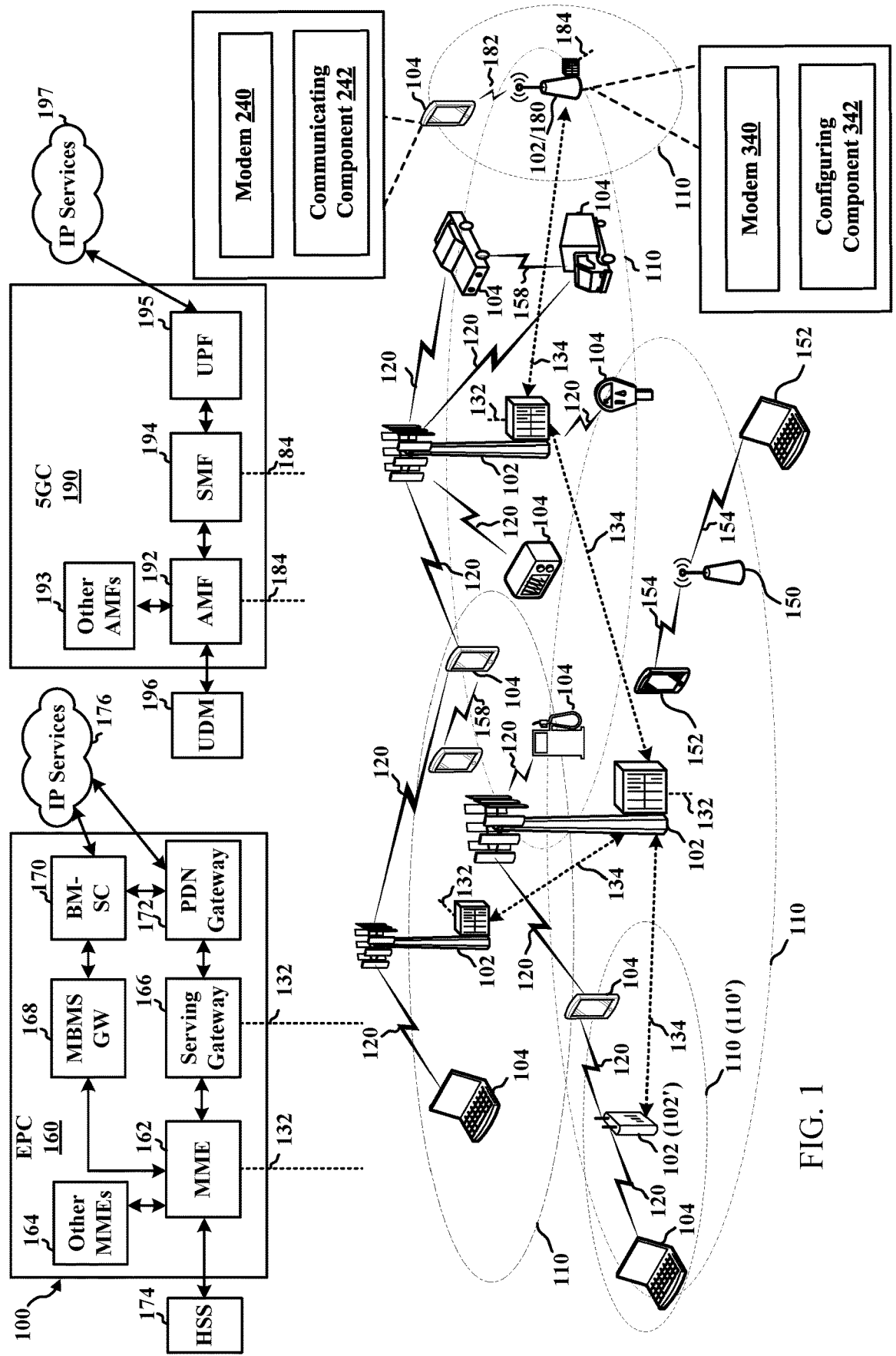
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to beam sweep based semi-persistent scheduling and/or configured grant activation in new radio (NR). Specifically, NR supports very high data rates with lower latency. As the NR band uses high frequencies for communication, propagation loss and other channel losses may be experienced. To compensate for the losses, directional communication may be useful at such frequencies. Antenna arrays with large number of antenna elements may enable such communication due to smaller wavelengths, providing beamforming gain to the radio frequency link budget which may help in compensation for propagation losses. To transmit on multiple directional beams, accurate alignment of transmitted and received beams may be implemented. In order to achieve alignment of beam pairs and to have end to end performance with desired delay, beam management operations may be performed in NR. For example, one such beam management operation may be beam sweeping, which refers to covering a spatial area with a set of beams transmitted and received according to pre-specified intervals and directions.

In some implementations, on the downlink, beam sweeping may correspond to an exhaustive search based on synchronization signal (SS) blocks received by UE. On the uplink, beam sweeping may be based on a sounding reference signal (SRS) transmitted by UE and received by the network entity (gNB). However, beam sweeping may not be performed during or for some types of signaling. In particular, beam sweeping may not be supported in semi-persistent scheduling (SPS) and/or configured grant (CG) activations. Instead, a single active beam may be used per grant for physical downlink shared channel (PDSCH) and/or physical uplink shared channel (PUSCH) transmission after activation. Hence, it would be desirable to implement beam sweeping in SPS and/or CG activations or reconfigurations (e.g., via downlink control information (DCI)) to improve robustness of communication on one or both the uplink and downlink. Implementing beam sweeping during such signaling may be desirable when a retransmission cycle is not long enough for any retransmissions (e.g. 0.5 ms). Specifically, a beam sweep pattern may be dynamically indicated in an activation DCI and may be multiplexed in a time domain (e.g., slot based or mini-slot based), in a frequency domain, or spatial domain.

In one implementation, a network entity may determine a beam sweep pattern for at least one of a SPS based downlink periodic transmission, an uplink control transmission for the SPS based downlink periodic transmission, or a CG based uplink periodic transmission. The network entity may also transmit an indication including the beam sweep pattern to a UE. In another implementation, a UE may receive a beam sweep pattern for at least one of a SPS based downlink periodic transmission, an uplink control transmission for the SPS based downlink periodic transmission, or a CG based uplink periodic transmission from a network entity. The UE may configure communication using two or more beams on at least one of an uplink channel or downlink channel based on the beam sweep pattern. The UE may further communicate data according to the beam sweep pattern on at least one of the uplink channel or the downlink channel.

The described features will be presented in more detail below with reference to FIGS. 1-10.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining configuring communication based on a beam sweep pattern received from the base station 102/gNB 180, as described herein. In addition, some nodes may have a modem 340 and configuring component 342 for determining a beam sweep pattern for SPS and/or CG activations, as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
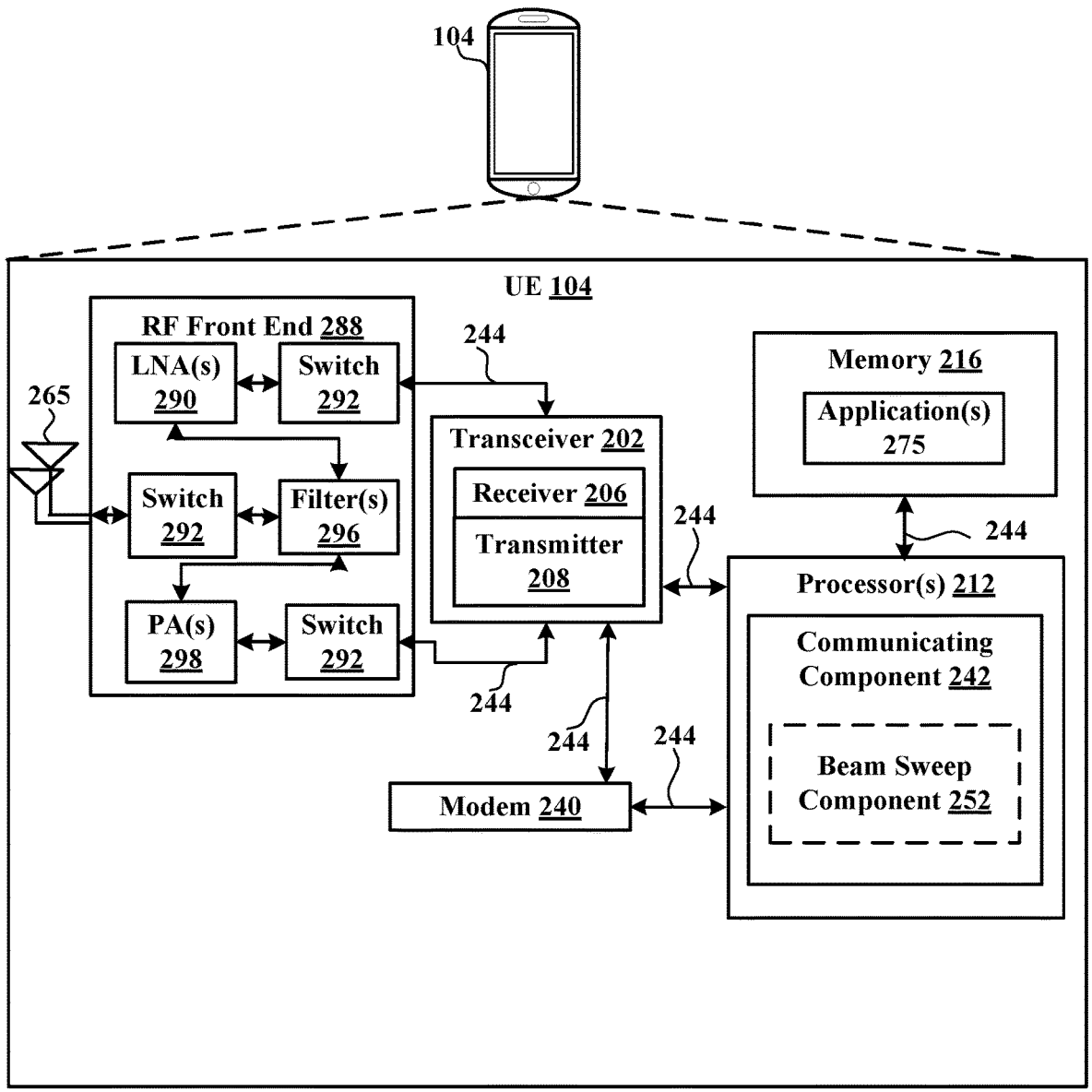
FIG. 2 is a block diagram illustrating an example of a UE, in accordance with various aspects of the present disclosure.
Figure 3:
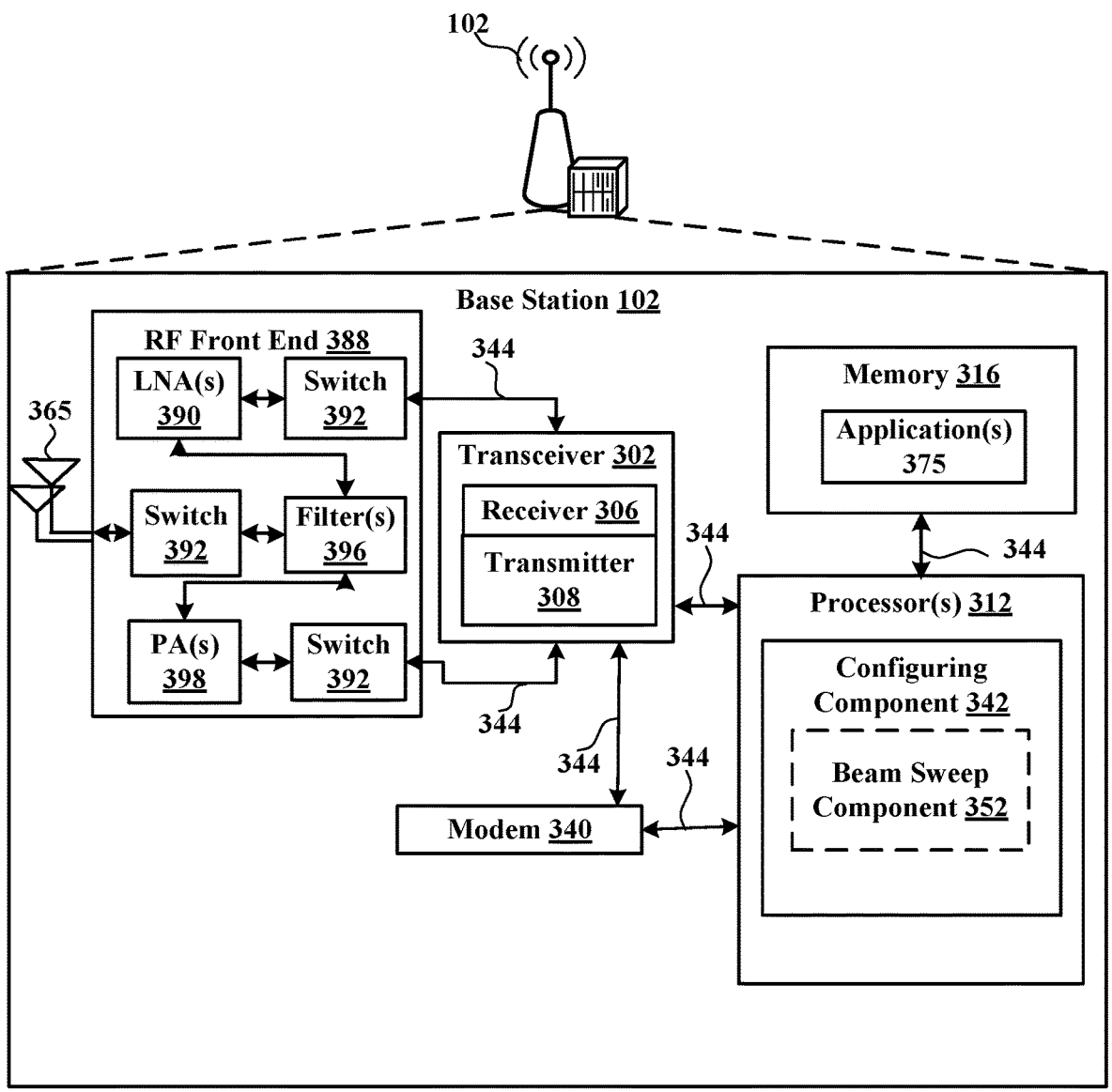
FIG. 3 is a block diagram illustrating an example of a base station, in accordance with various aspects of the present disclosure.
Figure 4:
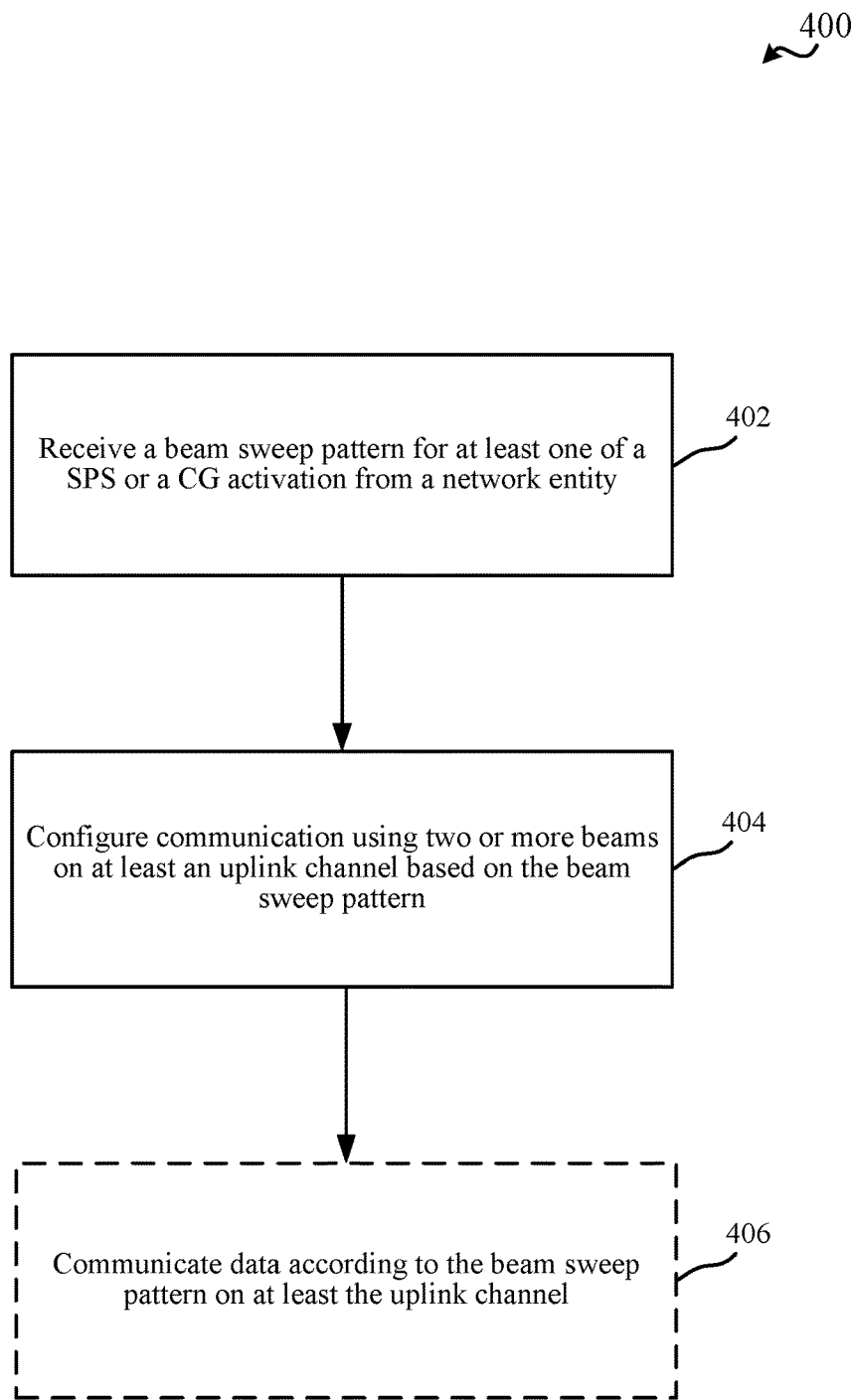
FIG. 4 is a flow chart illustrating an example of a method for wireless communications at a network entity, in accordance with various aspects of the present disclosure.
Figure 5:
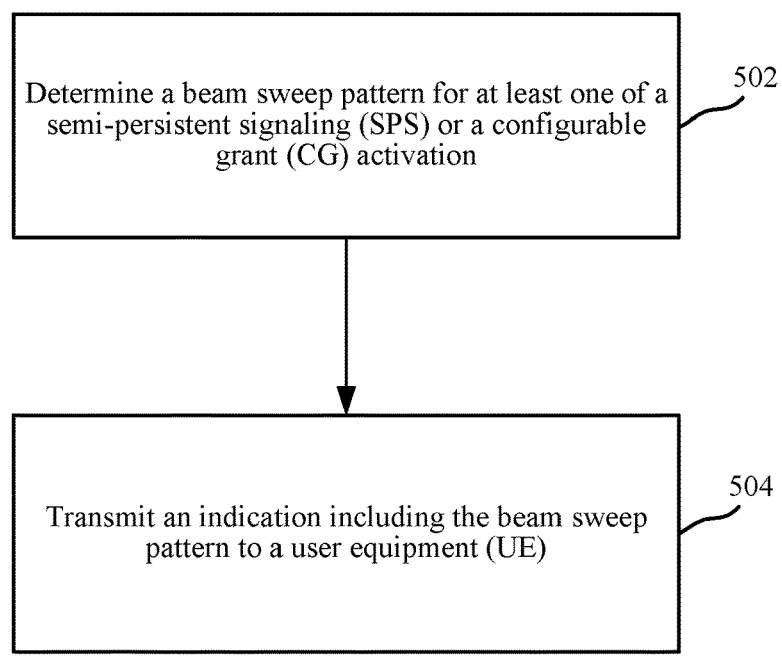
FIG. 5 is a flow chart illustrating an example of a method for wireless communications at a UE, in accordance with various aspects of the present disclosure.
Figure 6:
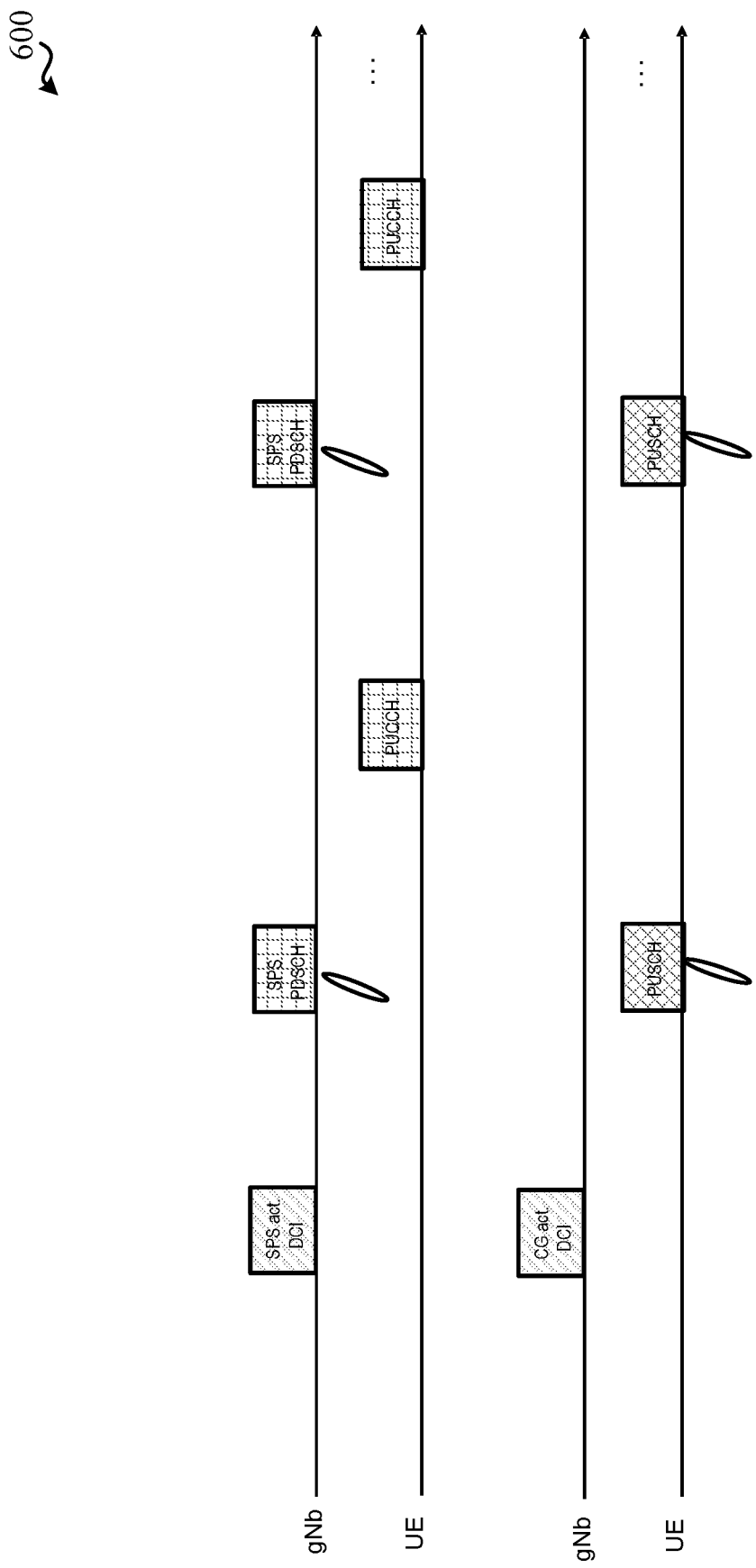
FIG. 6 is a conceptual diagram of a communication flow between a network entity and a UE, in accordance with various aspects of the present disclosure.
Figure 7:
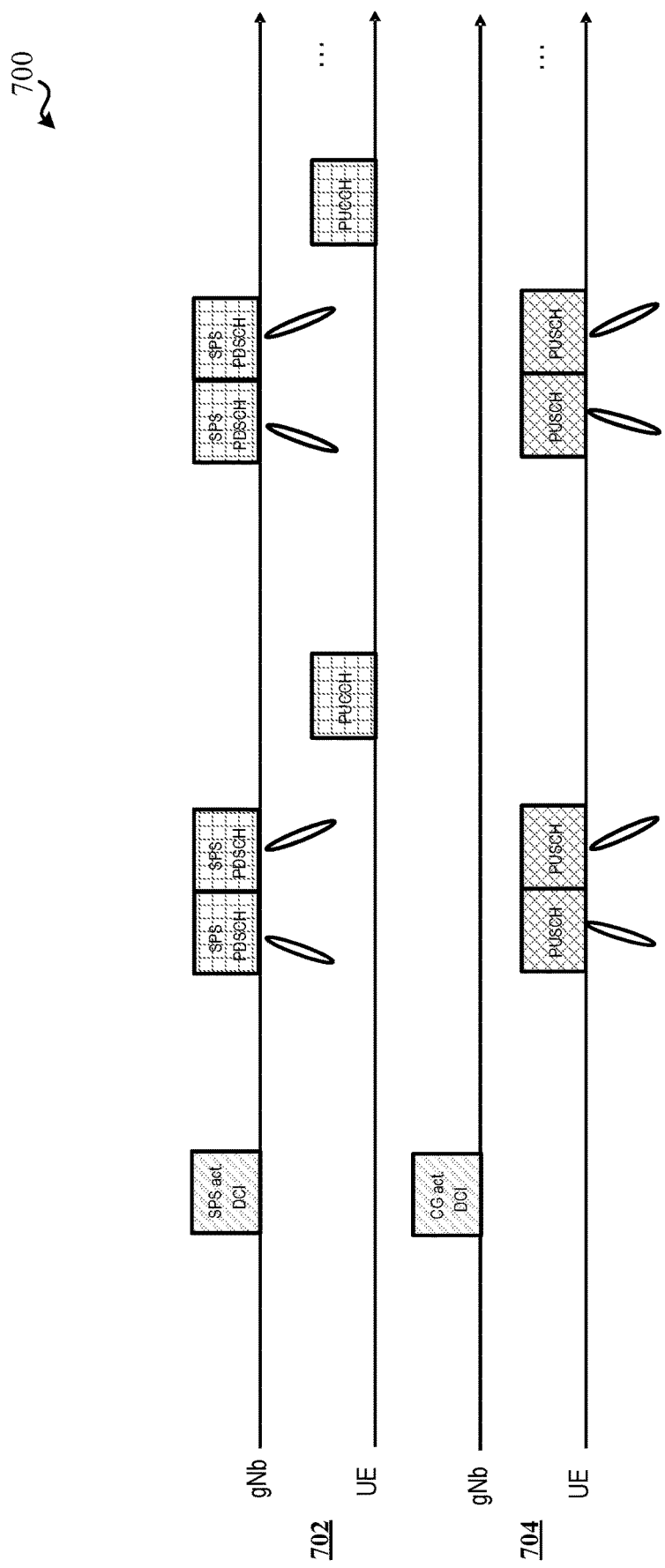
FIG. 7 is a conceptual diagram of another communication flow between a network entity and a UE, in accordance with various aspects of the present disclosure.
Figure 8:
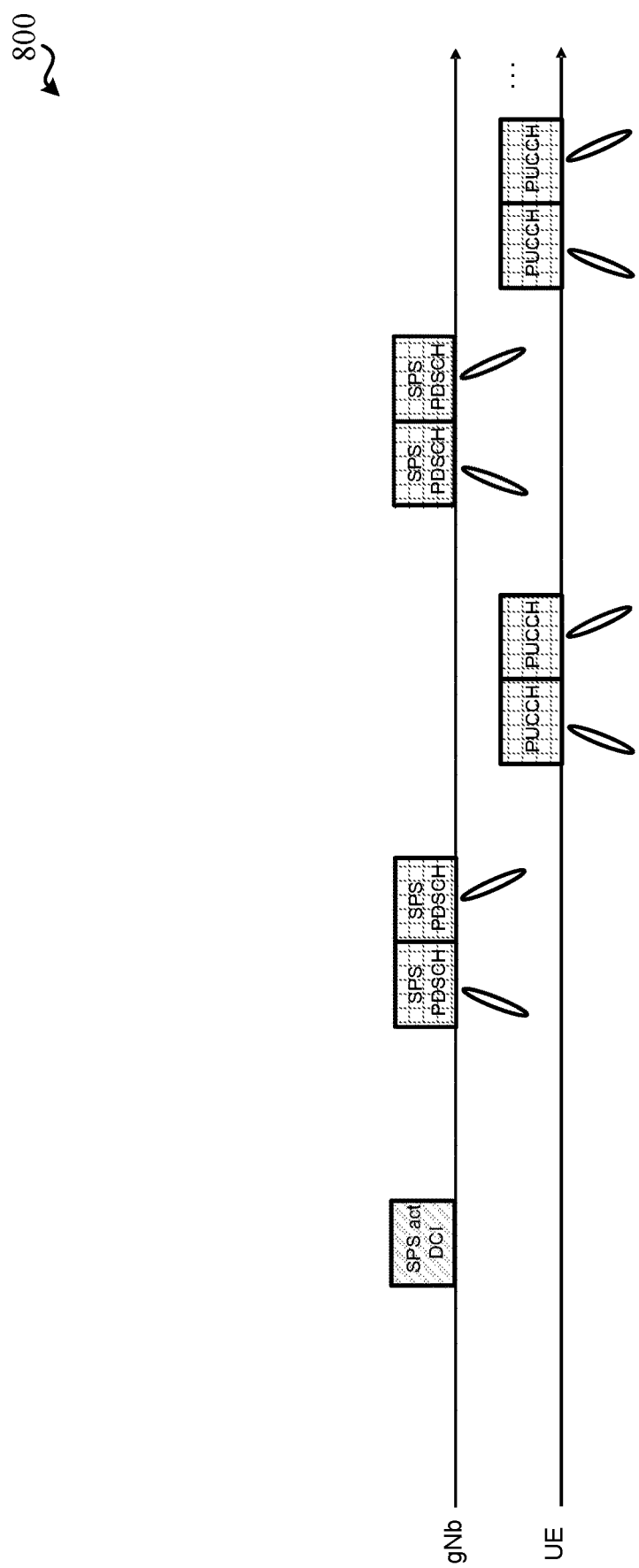
FIG. 8 is a conceptual diagram of a further communication flow between a network entity and a UE, in accordance with various aspects of the present disclosure.
Figure 9:
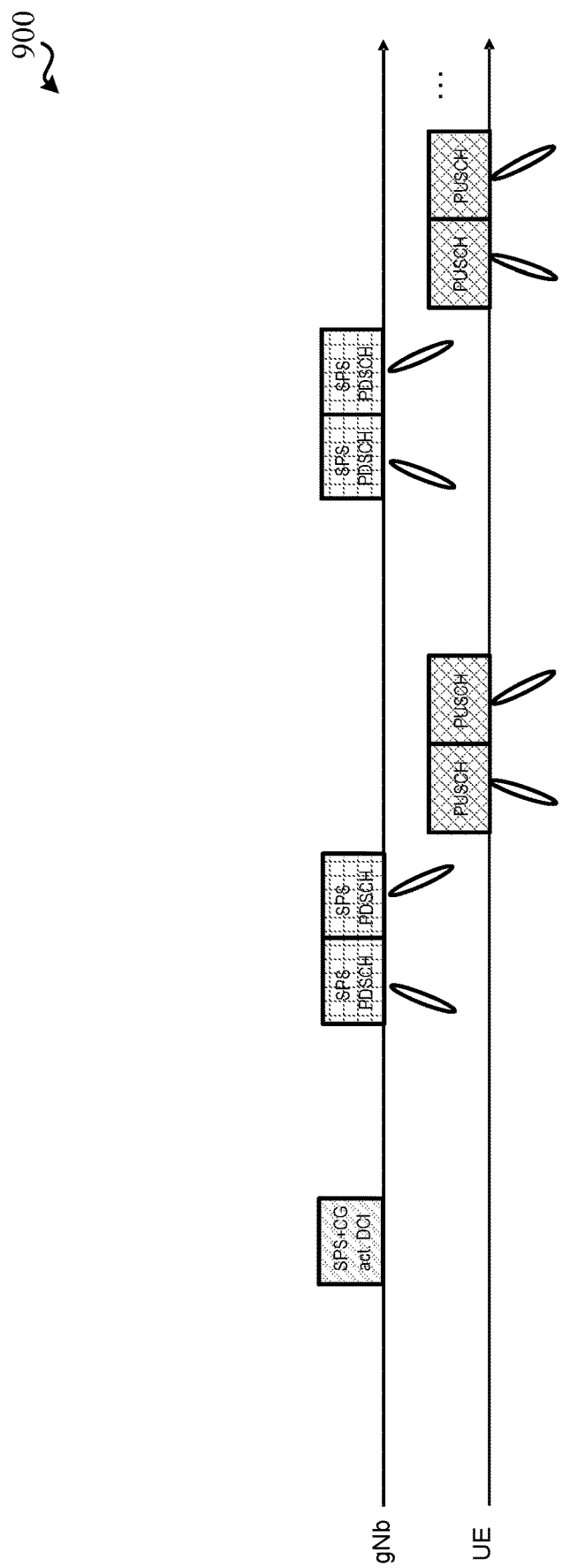
FIG. 9 illustrates a conceptual diagram of yet another communication flow between a network entity and a UE.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a beam sweep component 252 for configuring SPS and/or CG transmissions based on a beam sweep pattern received from a network entity (e.g., eNB) as further described herein with regard to FIG. 4.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for scheduling or otherwise enabling usage of resources for transmitting random access messages, transmitting response messages to the random access messages, etc.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a beam sweep pattern component 352 for determining a beam sweep pattern for SPS and/or CG activations as further described herein with regard to FIG. 5.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for wireless communications at a UE. In one example, a UE 104 can perform the functions described in method 400 using one or more of the components described in FIGS. 1 and 2.

At block 402, the method 400 may receive a beam sweep pattern for at least one of a SPS based downlink periodic transmission, an uplink control transmission for the SPS based downlink periodic transmission, or a CG based uplink periodic transmission from a network entity. In an aspect, beam sweep component 252, e.g., in conjunction with processor(s) 212, memory 216, transceiver 202, communicating component 242, etc., may be configured to receive a beam sweep pattern for at least one of a SPS based downlink periodic transmission, an uplink control transmission for the SPS based downlink periodic transmission, or a CG based uplink periodic transmission from a network entity. Thus, the UE 104, the processor(s) 212, the communicating component 242 or one of its subcomponents may define the means for receiving a beam sweep pattern for at least one of a SPS based downlink periodic transmission, an uplink control transmission for the SPS based downlink periodic transmission, or a CG based uplink periodic transmission from a network entity.

In some implementations, the uplink control transmission for the SPS based downlink periodic transmission may carry at least a corresponding acknowledgement.

In some implementations, the uplink control transmission may be carried in a physical uplink control channel (PUCCH).

In some implementations, the beam sweep pattern corresponds to multiple beam pair links communicated in a time division multiplexing (TDM) based, frequency division multiplexing (FDM) based, spatial division multiplexing (SDM) based scheme, or any combination thereof.

In some implementations, the TDM based beam sweep pattern may configure the SPS based downlink transmission, the uplink control transmission for SPS, or the CG transmission via different beam pair links at different time allocations.

In some implementations, the different time allocations may correspond to different slots or different mini-slots.

In some implementations, the FDM based beam sweep pattern may configure the SPS based downlink transmission, the uplink control transmission for SPS, or the CG transmission via different beam pair links at different frequency allocations.

In some implementations, the SDM based beam sweep pattern may correspond configures the SPS based downlink transmission, the uplink control transmission for SPS, or the CG transmission via different beam pair links simultaneously at overlapped allocations in time and frequency.

In some implementations, each of the multiple beam pair links may be indicated by a transmission configuration indicator (TCI) state or codepoint if the beam pair link carries downlink traffic.

In some implementations, each of the multiple beam pair links may be indicated by a spatial relation indication if the beam pair link carries uplink traffic.

At block 404, the method 400 may configure communication using two or more beams on at least one of an uplink channel or downlink channel based on the beam sweep pattern. In an aspect, guard band allocation component 252, e.g., in conjunction with processor(s) 212, memory 216, transceiver 202, communicating component 242, etc., may be configured to configure communication using two or more beams on at least one of an uplink channel or downlink channel based on the beam sweep pattern. Thus, the UE 104, the processor(s) 212, the communicating component 242 or one of its subcomponents may define the means for configuring communication using two or more beams on at least one of an uplink channel or downlink channel based on the beam sweep pattern.

At block 406, the method 400 may communicate data according to the beam sweep pattern on at least one of the uplink channel or downlink channel. In an aspect, guard band allocation component 252, e.g., in conjunction with processor(s) 212, memory 216, transceiver 202, communicating component 242, etc., may be configured to communicate data according to the beam sweep pattern on at least one of the uplink channel or the downlink channel. Thus, the UE 104, the processor(s) 212, the communicating component 242 or one of its subcomponents may define the means for communicating data according to the beam sweep pattern on at least one of the uplink channel or downlink channel.

FIG. 5 illustrates a flow chart of an example of a method 500 for wireless communication at a network entity 102. In an example, a base station 102 can perform the functions described in method 500 using one or more of the components described in FIGS. 1 and 3.

At block 502, the method 500 may determine a beam sweep pattern for at least one of a SPS based downlink periodic transmission, an uplink control transmission for the SPS based downlink periodic transmission, or a CG based uplink periodic transmission. In an aspect, the beam sweep component 252, e.g., in conjunction with processor(s) 312, memory 316, transceiver 302, configuring component 342, etc., may be configured to a beam sweep pattern for at least one of a SPS based downlink periodic transmission, an uplink control transmission for the SPS based downlink periodic transmission, or a CG based uplink periodic transmission. Thus, the network entity 102, the processor(s) 312, the configuring component 342 or one of its subcomponents may define the means for determining a beam sweep pattern for at least one of a SPS based downlink periodic transmission, an uplink control transmission for the SPS based downlink periodic transmission, or a CG based uplink periodic transmission.

At block 504, the method 500 transmit an indication including the beam sweep pattern to a UE. In an aspect, beam sweep component 252, e.g., in conjunction with processor(s) 312, memory 316, transceiver 302, configuring component 342, etc., may be configured to transmit an indication including the beam sweep pattern to a UE. Thus, the network entity 102, the processor(s) 312, the configuring component 342 or one of its subcomponents may define the means for transmitting an indication including the beam sweep pattern to a UE.

In some aspects, the uplink control transmission for the SPS based downlink periodic transmission may carry at least a corresponding acknowledgement.

In some aspects, the uplink control transmission may be carried in a PUCCH.

In some aspects, the beam sweep pattern corresponds to multiple beam pair links communicated in a TDM based, FDM based, SDM based scheme, or any combination thereof.

In some aspects, the TDM based beam sweep pattern may configure the SPS based downlink transmission, the uplink control transmission for SPS, or the CG transmission via different beam pair links at different time allocations.

In some aspects, the different time allocations may correspond to different slots or different mini-slots.

In some aspects, the FDM based beam sweep pattern may configure the SPS based downlink transmission, the uplink control transmission for SPS, or the CG transmission via different beam pair links at different frequency allocations In some aspects, the SDM based beam sweep pattern may correspond configures the SPS based downlink transmission, the uplink control transmission for SPS, or the CG transmission via different beam pair links simultaneously at overlapped allocation in time and frequency.

In some aspects, each of the multiple beam pair links may be indicated by a TCI state or codepoint if the beam pair link carries downlink traffic.

In some aspects, each of the multiple beam pair links may be indicated by a spatial relation indication if the beam pair link carries uplink traffic.

In some aspects, the indication may correspond to DCI. In some aspects, sending the indication may include multiplexing the DCI according to at least one of a time based, frequency based, or spatial based scheme for transmission.

In some aspects, the indication may correspond to a MAC CE. In some aspects, although not shown, the method 500 may further transmit an activation DCI to the UE to indicate utilization of the beam sweep pattern indicated in the MAC CE.

In some aspects, the indication may correspond to a radio resource control (RRC) message. In some aspects, the indication may include at least an index value associated with the beam sweep pattern and a beam sweep pattern list including one or more index values each associated with a distinct beam sweep beam, the beam sweep pattern including the index value associated with the beam sweep pattern.

In some aspects, although not shown, the method 500 may further transmit a redundancy version independently of or with the transmission of the beam sweep pattern.

In some aspects, determining the beam sweep pattern may include determining the beam sweep pattern for SPS activation on a PUSCH. In some aspects, the indication corresponds to DCI. In some aspects, the beam sweep pattern may configure both uplink and downlink communication.

FIGS. 6-10 are conceptual diagrams of example communication flows between a network entity (e.g., gNB) such base station 102 and a UE such as a UE 104. For example, the network entity may configure the UE such that rather than using a single active beam per grant for PDSCH or PUSCH transmission after activation, beam sweeping may be implemented using multiple beams as part of SPS and/or CG activation.

In one implementation as shown by 702, a beam sweep pattern can be indicated in an activation DCI or MAC-CE. For instance, either an actual beam sweep pattern or an index associated with the beam sweep pattern can be indicated. Further, if the index is indicated, multiple patterns may be pre-configured by RRC message or MAC-CE with corresponding indices, and may be further down-selected for activation by MAC-CE. Additionally, the beam sweep pattern may be indicated in the MAC-CE for at least one SPS or CG configuration. In such case, an activation DCI may be used to dynamically indicate whether to use the beam sweep pattern for corresponding activated SPS or CG configuration (s). Further, in such case, SPS or CG configuration(s) indicated in a MAC-CE may always use the indicated pattern if activated.

In another implementation shown by 704, a beam sweep pattern can be indicated in an RRC configuration message. For instance, either an actual beam sweep pattern or an index associated with the beam sweep pattern can be indicated. Further, if the index is indicated, multiple patterns may be pre-configured by RRC message with corresponding indices.

In both implementations, redundancy versions (RVs) can also be signaled per beam sweep pattern. The RVs may be signaled separately from beam sweep pattern, e.g. via actual RV pattern or the index. Alternatively, the RVs may be signaled jointly with beam sweep pattern, e.g. via joint beam sweep plus the RV pattern or corresponding joint index.

Referring to 800, in the case of SPS activation only, a PUCCH beam sweep pattern can be indicated in activation DCI as well. The PUCCH beam sweep pattern or the index can be explicitly signaled in activation DCI, MAC-CE, or RRC message.

Alternatively, individual PUCCH resources can be configured with repetition transmissions having corresponding beam sweep patterns, with the particular PUCCH resource identifiers to use dynamically indicated by activation DCI. For a similar number of repetitions, the PUCCH beam sweep pattern can be unspecified such that the PDSCH beam sweep pattern can be reused.

Referring to 900, to reduce overhead, the downlink and uplink beam sweep patterns can be indicated in a single DCI activating both SPS and CG. For a similar number of repetitions, the PUSCH beam sweep pattern can be unspecified and the PDSCH beam sweep pattern may be reused. To further reduce overhead, beam sweep pattern per SPS or CG configuration can be indicated in single DCI activating multiple SPS and/or CG configurations. For a similar number of repetitions, only a single SPS or CG beam sweep pattern can be specified, and other SPS or CG configurations beam sweep patterns may be reused. The forgoing can be applied to other parameters, i.e. a parameter specified for one SPS or CG configuration can be applied to other SPS or CG configurations if corresponding parameter is unspecified for those configurations, or a common parameter is indicated for all.

Figure 10:
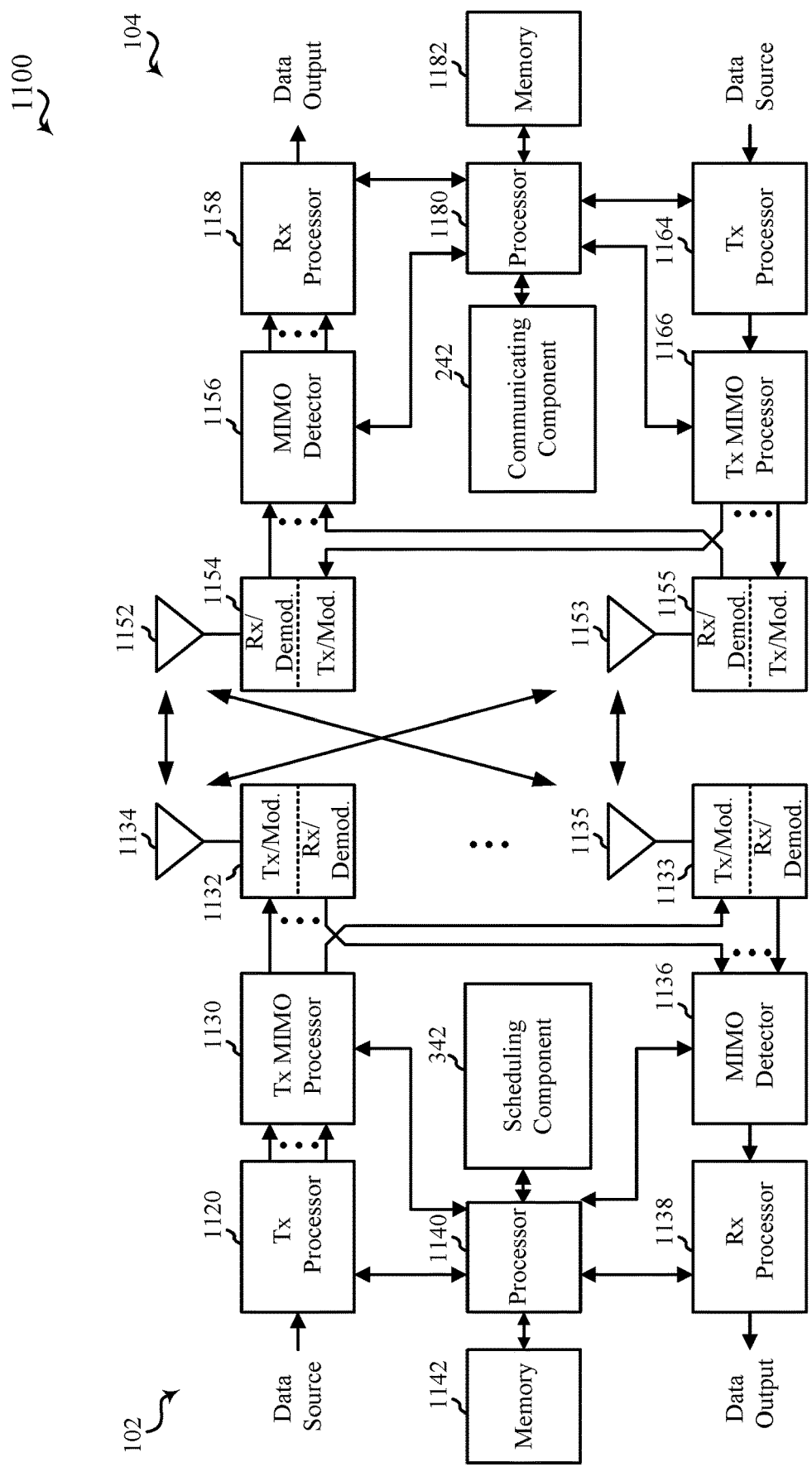
FIG. 10 is a block diagram illustrating an example of a MIMO communication system including a base station and a UE, in accordance with various aspects of the present disclosure.

FIG. 10 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1-2. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a communicating component 242 (see e.g., FIGS. 1 and 2).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1100.

Some Further Examples

In one example, a method for wireless communication at a network entity includes determining a beam sweep pattern for at least one of a SPS based downlink periodic transmission, an uplink control transmission for the SPS based downlink periodic transmission, or a CG based uplink periodic transmission activation, and transmitting an indication including the beam sweep pattern to a user equipment.

One or more of the above examples can further include wherein the uplink control transmission for the SPS based downlink periodic transmission carries at least a corresponding acknowledgement.

One or more of the above examples can further include wherein the uplink control transmission is carried in a physical uplink control channel (PUCCH).

One or more of the above examples can further include wherein the beam sweep pattern corresponds to multiple beam pair links communicated in a time division multiplexing (TDM) based, frequency division multiplexing (FDM) based, spatial division multiplexing (SDM) based scheme, or any combination thereof.

One or more of the above examples can further include wherein the TDM based beam sweep pattern configures the SPS based downlink transmission, the uplink control transmission for SPS, or the CG transmission via different beam pair links at different time allocations.

One or more of the above examples can further include wherein the different time allocations correspond to different slots or different mini-slots.

One or more of the above examples can further include wherein the FDM based beam sweep pattern configures the SPS based downlink transmission, the uplink control transmission for SPS, or the CG transmission via different beam pair links at different frequency allocations.

One or more of the above examples can further include wherein the SDM based beam sweep pattern corresponds configures the SPS based downlink transmission, the uplink control transmission for SPS, or the CG transmission via different beam pair links simultaneously at overlapped allocations in time and frequency.

One or more of the above examples can further include wherein each of the multiple beam pair links is indicated by a transmission configuration indicator (TCI) state or codepoint.

One or more of the above examples can further include wherein each of the multiple beam pair links is indicated by a spatial relation indication.

One or more of the above examples can further include wherein the indication corresponds to or signaled in a DCI.

One or more of the above examples can further include wherein the indication is transmitted to a MAC CE.

One or more of the above examples can further include transmitting an activation DCI to the UE to indicate utilization of the beam sweep pattern indicated in the MAC CE.

One or more of the above examples can further include wherein the indication corresponds to a radio resource control (RRC) message.

One or more of the above examples can further include wherein the indication includes at least an index value associated with the beam sweep pattern and a beam sweep pattern list including one or more index values each associated with a distinct beam sweep beam.

One or more of the above examples can further include wherein the association of each index value with the beam sweep pattern is configured by an RRC message or a MAC-CE.

One or more of the above examples can further include wherein each configured index value associated with a beam sweep pattern index is down-selected for activation by the MAC-CE.

One or more of the above examples can further include further comprising transmitting a redundancy version pattern independently of or jointly with the transmission of the beam sweep pattern.

One or more of the above examples can further include wherein a single common beam sweep pattern is transmitted for at least two of the SPS based downlink transmission, the uplink control transmission for SPS, or the CG transmission.

One or more of the above examples can further include wherein a single common beam sweep pattern is transmitted for at least two different SPS based downlink configurations.

One or more of the above examples can further include wherein a single common beam sweep pattern is transmitted for at least two different CG configurations.

In another example, a method for wireless communication at a user equipment includes receiving a beam sweep pattern for at least one of a semi-persistent scheduling (SPS) based downlink periodic transmission, an uplink control transmission for the SPS based downlink periodic transmission, or a configured grant (CG) based uplink periodic transmission from a network entity, configuring communication using two or more beams on at least one of an uplink channel or downlink channel based on the beam sweep pattern, and communicating data according to the beam sweep pattern on at least one of the uplink channel or the downlink channel.

One or more of the above examples can further include wherein the uplink control transmission for the SPS based downlink periodic transmission carries at least a corresponding acknowledgement.

One or more of the above examples can further include wherein the uplink control transmission is carried in a physical uplink control channel (PUCCH).

One or more of the above examples can further include wherein the beam sweep pattern corresponds to multiple beam pair links communicated in a time division multiplexing (TDM) based, frequency division multiplexing (FDM) based, spatial division multiplexing (SDM) based scheme, or any combination thereof.

One or more of the above examples can further include wherein the TDM based beam sweep pattern configures the SPS based downlink transmission, the uplink control transmission for SPS, or the CG transmission via different beam pair links at different time allocations.

One or more of the above examples can further include wherein the different time allocations correspond to different slots or different mini-slots.

One or more of the above examples can further include wherein the FDM based beam sweep pattern configures the SPS based downlink transmission, the uplink control transmission for SPS, or the CG transmission via different beam pair links at different frequency allocations.

One or more of the above examples can further include wherein the SDM based beam sweep pattern corresponds configures the SPS based downlink transmission, the uplink control transmission for SPS, or the CG transmission via different beam pair links simultaneously at overlapped allocations in time and frequency.

One or more of the above examples can further include wherein each of the multiple beam pair links is indicated by a transmission configuration indicator (TCI) state or codepoint.

One or more of the above examples can further include wherein each of the multiple beam pair links is indicated by a spatial relation indication.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a network entity, comprising: determining a beam sweep pattern for at least one of a semi-persistent scheduling (SPS) based downlink periodic transmission, an uplink control transmission for the SPS based downlink periodic transmission, or a configured grant (CG) based uplink periodic transmission, wherein the beam sweep pattern corresponds to a time division multiplexing (TDM) based scheme, frequency division multiplexing (FDM) based scheme, spatial division multiplexing (SDM) based scheme, or any combination thereof, and wherein the beam sweep pattern further corresponds to multiple beam pair links, wherein each of the multiple beam pair links is indicated by a spatial relation indication, transmission configuration indicator (TCI) state or codepoint; and transmitting an indication corresponding to the beam sweep pattern to a user equipment (UE).

2. The method of claim 1, wherein the uplink control transmission for the SPS based downlink periodic transmission carries at least a corresponding acknowledgement.

3. The method of claim 1, wherein the uplink control transmission is carried in a physical uplink control channel (PUCCH).

4. The method of claim 1, wherein the TDM based beam sweep pattern configures the SPS based downlink transmission, the uplink control transmission for SPS, or the CG transmission via different beam pair links at different time allocations, and wherein the different time allocations correspond to different slots or different mini-slots.

5. The method of claim 1, wherein the FDM based beam sweep pattern configures the SPS based downlink transmission, the uplink control transmission for SPS, or the CG transmission via different beam pair links at different frequency allocations.

6. The method of claim 1, wherein the SDM based beam sweep pattern corresponds configures the SPS based downlink transmission, the uplink control transmission for SPS, or the CG transmission via different beam pair links simultaneously at overlapped allocations in time and frequency.

7. The method of claim 1, wherein the indication is signaled in downlink control information (DCI).

8. The method of claim 1, wherein the indication is transmitted in a media access control (MAC) control element (CE), the method further comprising transmitting an activation downlink control information (DCI) to the UE to indicate utilization of the beam sweep pattern indicated in the MAC CE.

9. The method of claim 1, wherein the indication corresponds to a radio resource control (RRC) message.

10. The method of claim 1, wherein the indication includes at least an index value associated with the beam sweep pattern, and a beam sweep pattern list including one or more index values, each associated with a distinct beam sweep beam pair link.

11. The method of claim 10, wherein the association of each index value with the beam sweep pattern is configured by a media access control (MAC) control element (CE) an RRC message, and wherein each configured index value associated with a beam sweep pattern index is down-selected for activation by the MAC-CE.

12. The method of claim 1, further comprising transmitting a redundancy version pattern independently of or jointly with the transmission of the beam sweep pattern.

13. The method of claim 1, wherein a single common beam sweep pattern is transmitted for at least two of the SPS based downlink transmission, the uplink control transmission for SPS, or the CG transmission.

14. The method of claim 1, wherein a single common beam sweep pattern is transmitted for at least two different SPS based downlink configurations.

15. The method of claim 1, wherein a single common beam sweep pattern is transmitted for at least two different CG configurations.

16. A method for wireless communication at a user equipment, comprising:
receiving a beam sweep pattern for at least one of a semi-persistent scheduling (SPS) based downlink periodic transmission, an uplink control transmission for the SPS based downlink periodic transmission, or a configured grant (CG) based uplink periodic transmission from a network entity, wherein the beam sweep pattern corresponds to a time division multiplexing (TDM) based scheme, frequency division multiplexing (FDM) based scheme, spatial division multiplexing (SDM) based scheme, or any combination thereof, wherein the beam sweep pattern further corresponds to multiple beam pair links, wherein each of the multiple beam pair links is indicated by a spatial relation indication, transmission configuration indicator (TCI) state or codepoint; and
configuring communication using two or more beams on at least one of an uplink channel or a downlink channel based on the beam sweep pattern.

17. The method of claim 16, wherein the uplink control transmission for the SPS based downlink periodic transmission carries at least a corresponding acknowledgement.

18. The method of claim 16, wherein the uplink control transmission is carried in a physical uplink control channel (PUCCH).

19. The method of claim 16, wherein the TDM based beam sweep pattern configures the SPS based downlink transmission, the uplink control transmission for SPS, or the CG transmission via different beam pair links at different time allocations.

20. The method of claim 19, wherein the different time allocations correspond to different slots or different mini-slots.

21. The method of claim 16, wherein the FDM based beam sweep pattern configures the SPS based downlink transmission, the uplink control transmission for SPS, or the CG transmission via different beam pair links at different frequency allocations.

22. The method of claim 16, wherein the SDM based beam sweep pattern corresponds configures the SPS based downlink transmission, the uplink control transmission for SPS, or the CG transmission via different beam pair links simultaneously at overlapped allocations in time and frequency.

23. An apparatus for wireless communication, comprising:
a transceiver;
a memory configured to store instructions; and
at least one processor communicatively coupled with the transceiver and the memory, wherein the at least one processor is configured to:
determine a beam sweep pattern for at least one of a semi-persistent scheduling (SPS) based downlink periodic transmission, an uplink control transmission for the SPS based downlink periodic transmission, or a configured grant (CG) based uplink periodic transmission, wherein the beam sweep pattern corresponds to a time division multiplexing (TDM) based scheme, frequency division multiplexing (FDM) based scheme, spatial division multiplexing (SDM) based scheme, or any combination thereof, and wherein the beam sweep pattern further corresponds to multiple beam pair links, wherein each of the multiple beam pair links is indicated by a spatial relation indication, transmission configuration indicator (TCI) state or codepoint; and
transmit an indication corresponding to the beam sweep pattern to a user equipment (UE).

24. An apparatus for wireless communication, comprising:
a transceiver;
a memory configured to store instructions; and
at least one processor communicatively coupled with the transceiver and the memory, wherein the at least one processor is configured to:
receive a beam sweep pattern for at least one of a semi-persistent scheduling (SPS) based downlink periodic transmission, an uplink control transmission for the SPS based downlink periodic transmission, or a configured grant (CG) based uplink periodic transmission from a network entity, wherein the beam sweep pattern corresponds to a time division multiplexing (TDM) based scheme, frequency division multiplexing (FDM) based scheme, spatial division multiplexing (SDM) based scheme, or any combination thereof, wherein the beam sweep pattern further corresponds to multiple beam pair links, wherein each of the multiple beam pair links is indicated by a spatial relation indication, transmission configuration indicator (TCI) state or codepoint; and configure communication using two or more beams on at least one of an uplink channel or a downlink channel based on the beam sweep pattern.

\* \* \* \* \*